April 7, 1925.
T. O. PARTRIDGE
1,532,440
ROTARY BRICKMAKING MACHINE
Filed June 19, 1922    5 Sheets-Sheet 1
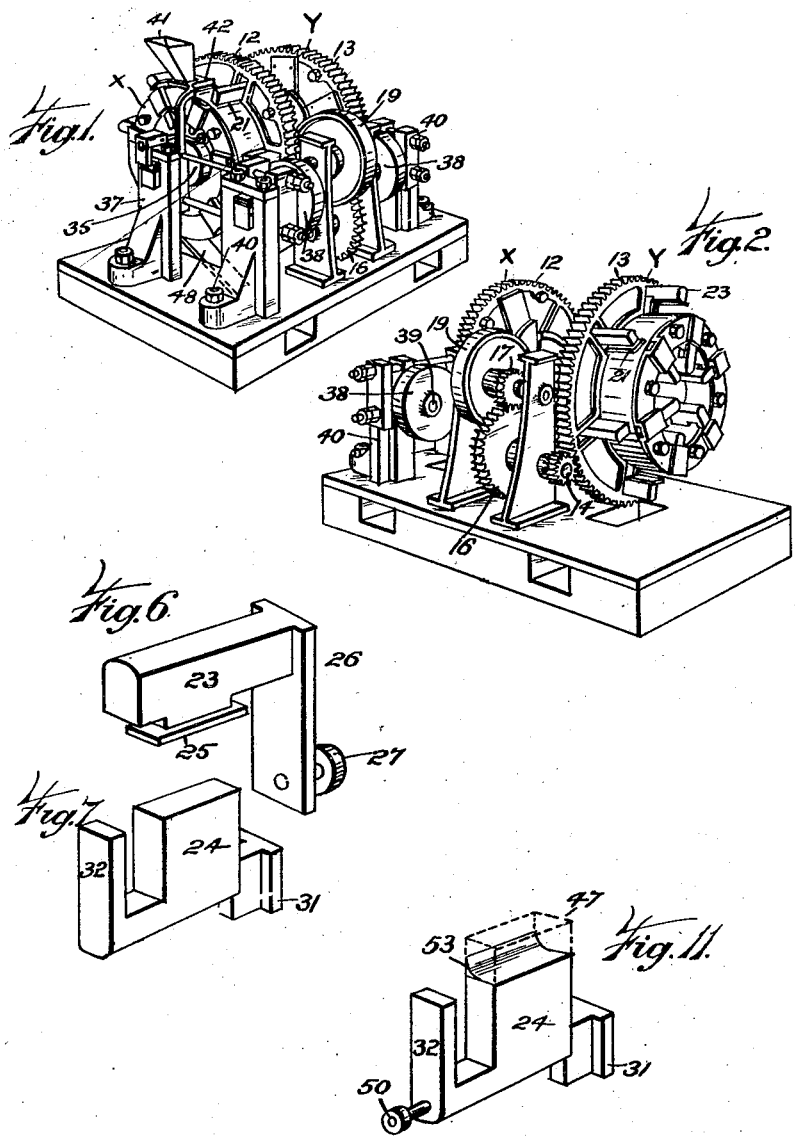

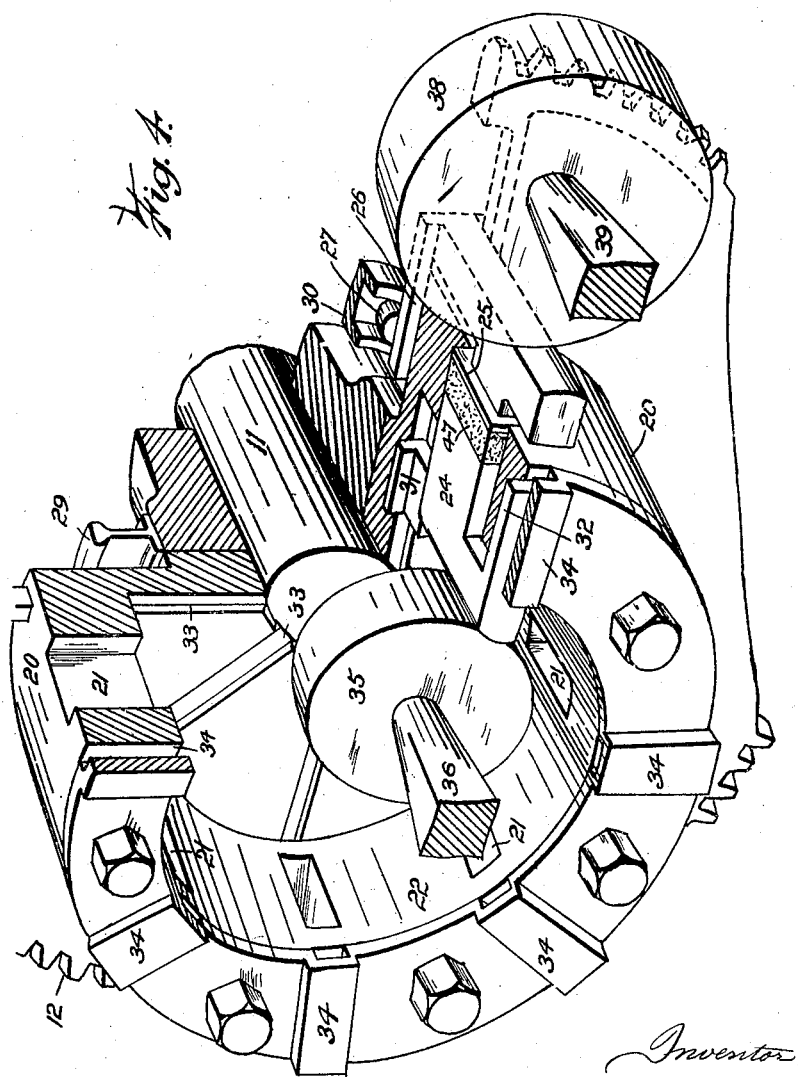

April 7, 1925.
T. O. PARTRIDGE
1,532,440
ROTARY BRICKMAKING MACHINE
Filed June 19, 1922     5 Sheets-Sheet 4
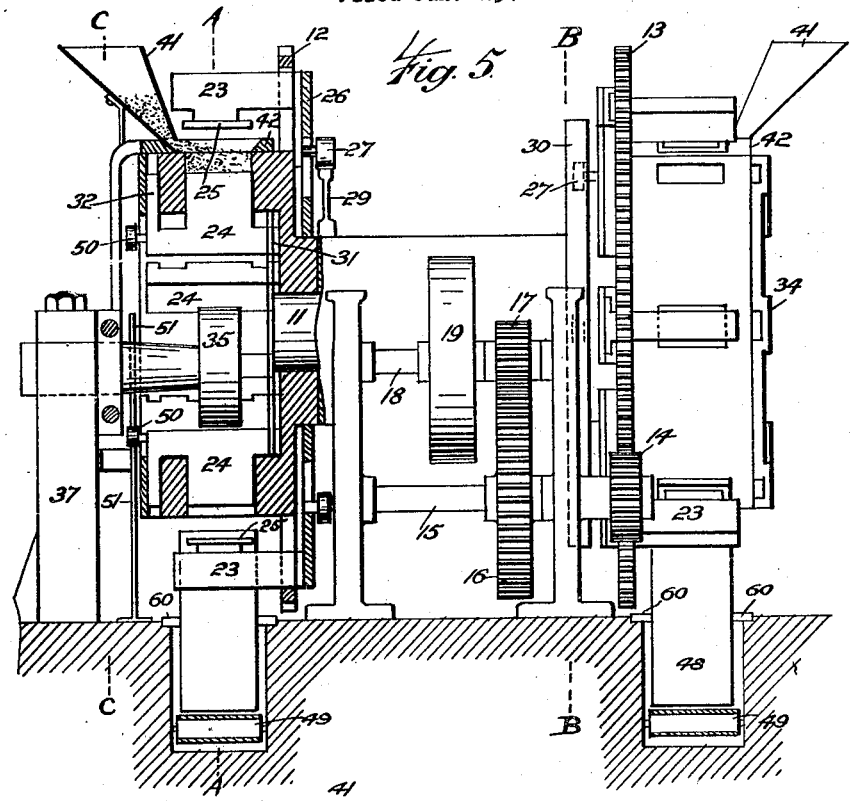
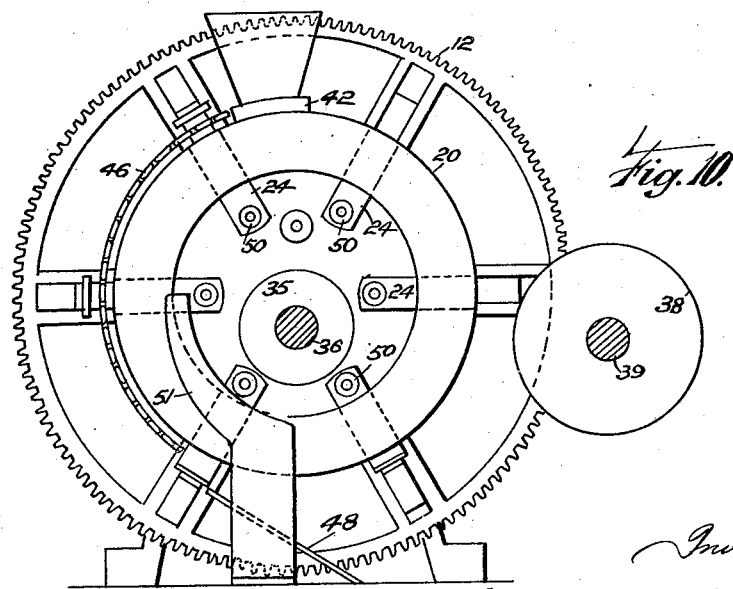
Inventor:
Thomas O. Partridge April 7, 1925.

T. O. PARTRIDGE

ROTARY BRICKMAKING MACHINE

Filed June 19, 1922    5 Sheets-Sheet 5

1,532,440

Inventor:
Thomas O. Partridge
per Chas. H. Rucker
Attorney.

Patented Apr. 7, 1925.

1,532,440

UNITED STATES PATENT OFFICE.

THOMAS OTWAY PARTRIDGE, OF NORTH SYDNEY, NEW SOUTH WALES, AUSTRALIA.

ROTARY BRICKMAKING MACHINE.

Application filed June 19, 1922. Serial No. 569,506.

*To all whom it may concern:*

Be it known that THOMAS OTWAY PARTRIDGE, subject of the King of Great Britain and Ireland, residing at St. Leonards, North Sydney, in the State of New South Wales, Commonwealth of Australia, has invented certain new and useful Improvements in Rotary Brickmaking Machines, of which the following is a specification.

This invention relates to brick making machines of the rotary type in which the bricks are dry pressed, and the object of the invention is to provide a continuously operating machine in which the material is automatically fed into a series of moulds in rotation and subjected to a gradual compression extending over an appreciable time.

A further object is to provide means for heating the moulds and plungers prior to compressing the material and means for delivering the compressed brick to a conveyor.

Another object is to provide means for adjusting the quantity of material fed to the moulds for the purpose of increasing or decreasing the density of the brick. The invention comprises one or more drums mounted on a common shaft rotatable in bearings supported by suitable standards secured to a bed plate or other foundation.

Each drum has in its outer periphery a series of apertures which form radially disposed mould boxes which extend to the inner periphery, and each of these mould boxes has an outer and an inner plunger movable in radial guides and operated partly by gravity and partly by cam races as hereinafter explained.

At one stage of the drums revolution each opposing plunger in its mould box with the material to be compressed between them passes between two opposing rollers which are adjusted to give the required compression. After compression the bricks are automatically released from the mould boxes to a tipping platform from which they pass to a conveyor.

But in order that the invention may be clearly understood reference will now be made to the drawings which accompany and form part of this complete specification and in which:—

Figure 1 is a perspective view of the complete machine.

Figure 2 is a similar view with the compressing rollers and supporting frame removed.

Figure 4 is a sectional perspective view of one of the drums showing a brick being compressed.

Figure 5 is a view showing a central vertical section of one drum and a front elevation of the other drum with compression mechanism and supporting frame removed.

Figures 6 and 7 are perspective views of the outer and inner plungers respectively.

Figure 8:
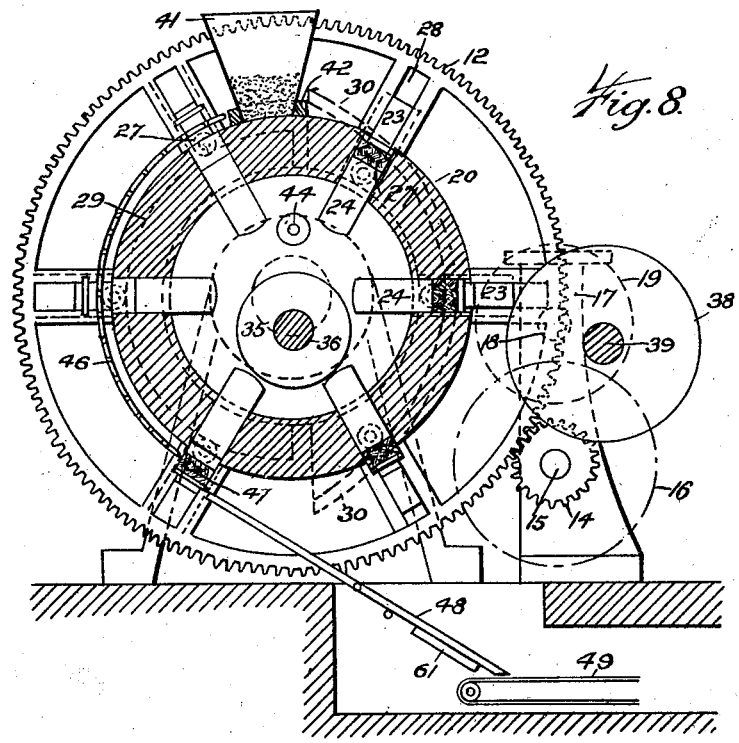

Figure 8 is a sectional elevation on line A. A. Figure 5.

Figure 9:
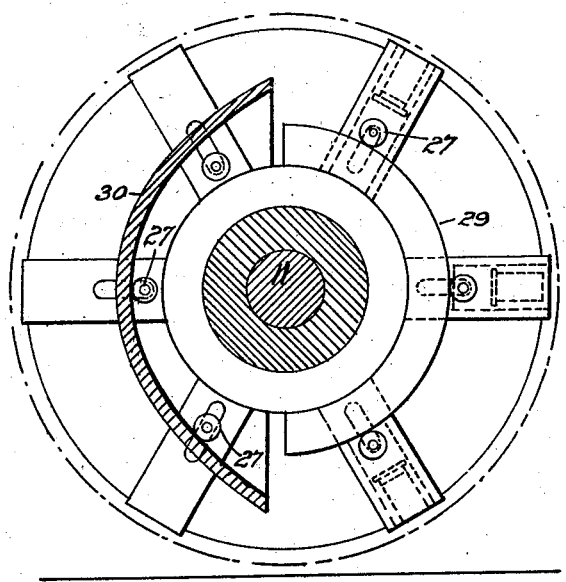

Figure 9 is a sectional elevation on line B. B. Figure 5.

Figure 10 is a sectional elevation on line C. C. Figure 5, showing an additional operation of the inner plungers.

Figure 11 is a perspective view showing a modified form of inner plunger.

The drums X and Y are keyed to a common shaft 11 and have integral therewith gear wheels 12 and 13 which gear with pinions 14 on shaft 15 carrying gear wheel 16 which meshes with pinion 17 on shaft 18 carrying pulley wheel 19 (see Figure 5) to which power is transmitted from any suitable source.

On the outer periphery 20 of each of the drums X and Y six mould boxes 21 are formed, these mould boxes are radially disposed and extend to the inner periphery 22. Each of the mould boxes 21 has an outer plunger 23 and an opposing inner plunger 24. The outer plunger 23 which is illustrated in Figure 6 has a die plate 25 and a right angular guide plate 26 with small friction roller 27. The die plates 25 are adapted to fit within the mould boxes 21 and the guide plates 26 move in radially disposed guide ways 28 on inner face of drums X and Y. The movement of the outer plungers 23 within the mould boxes is controlled by the roller 27 which engages during one half the drum revolution with an external cam way 29 and during the other half revolution with an internal cam way 30.

The inner and opposing plungers 24 which fit within the inner end of the mould boxes 21 have at one side a slide block 31 and at the other a slide plate 32. The slide blocks 31 move in guide ways 33 and the slide plates 32 move in guide ways 34.

Within each of the drums X and Y is a free rotating roller 35 mounted on trunnion 36 the axis of which is eccentric to the axis of the main shaft 11. The trunnion 36 is secured to and supported by frame standard 37.

On the outside of each of the drums X and Y is a roller 38 rotatably mounted on a fixed trunnion 39 which is adjustably secured to standard 40. The rollers 38 are in alignment with the inner rollers 35 so that each pair of opposing plungers 23 and 24 in mould boxes 21 are in turn forced between them as the drums revolve, and the intermediate material is thus compressed and the brick formed.

The dry material is fed through a hopper 41 which is affixed to the supporting frame of the drum, and delivered into a shallow receptacle or frame 42 which rests on or just clears the outer periphery of drum, and as each mould box 21 passes it is automatically filled (see Figure 5).

The depth of each mould box 21 the bottom of which is formed by the inner plunger 24 is automatically adjusted to a predetermined capacity by an adjustable arm 43 which has on its free end a small roller 44 which engages in turn the inner plungers 24 and adjusts their position in the mould box after receiving the material from the hopper 41. The roller 44 is raised or lowered by a screw adjustment 45. A heating system is provided for drying the mould boxes and plungers and consists of a steam coil or electric heating unit 46 which surrounds a portion of the outer periphery of the drums.

Figure 3:
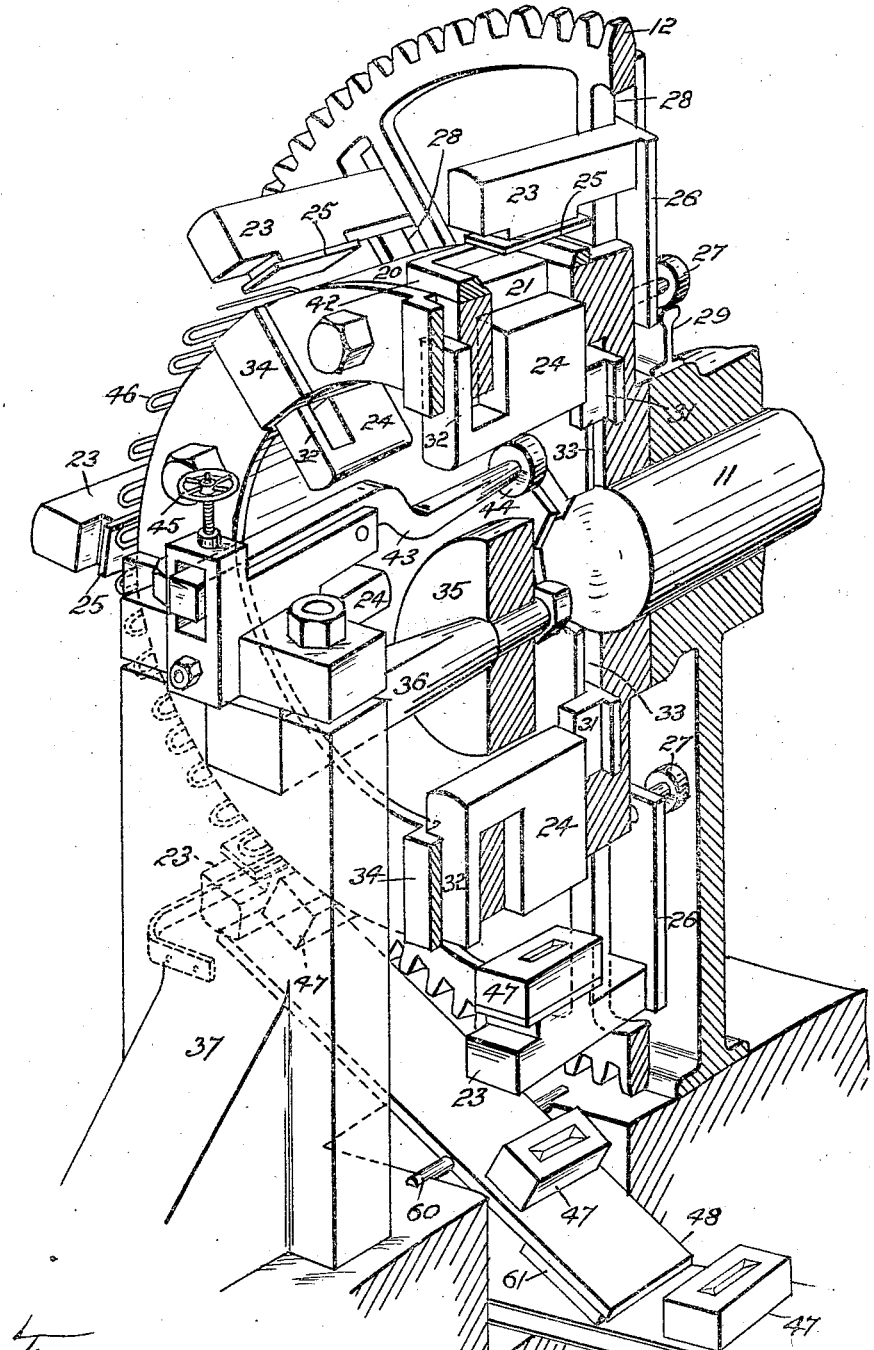
Figure 3 is a vertical sectional perspective view of one of the drums.

Each brick 47 is automatically delivered onto an inclined and counter balanced platform 48 from which it slides onto a belt conveyor 49 (see Figures 3 and 5). The platform 48 is supported on trunnions 60 and has a counter weight 61 at its lower end which maintains it normally in an inclined position.

Referring to Figure 10. When it is desired to mould a special brick say with a bull nose edge it is necessary to form a projection 53 on the face of the inner plunger as shown in Figure 11 and this projection if not withdrawn into the mould box after the pressed brick is delivered onto the platform 48 would come into contact with the heating system 46, it is therefore necessary to obviate this difficulty and this is effected by providing small rollers 50 on face of slide plate 32 of plungers 24 which rollers engage in turn with a cam race 51 which causes the plungers while in contact therewith to be drawn into the mould boxes clear of the heating system.

In operation—The dry material is fed through the hopper 41 to the shallow bottomless receptacle 42 which is attached thereto from which it passes and fills the mould box 21 as the drum revolves, the surplus material being retained in the receptacle 42. Prior to and during the filling of each mould box, the outer plunger 23 is held suspended clear of the periphery 20 by means of the small rollers 27 which engage the external camway 29. After the mould box 21 has been filled the roller 27 loses contact with the camway 29 and drops into the internal camway 30 and the die plate 25 enters the mould box 21 and the continued revolution of the drum and travel of the roller 27 in camway 30 causes the plunger 23 to move inwards and exert a gradual pressure on the material between the two plungers. Further revolution of the drum forces the opposing plungers 23 and 24 between the opposing rollers 35 and 38 which are adjusted to give the final required compression to form the brick 47 as shown in Figure 4. After the plungers have passed between the compression rollers 35 and 38 the small roller 27 following the outward curve of the camway 30 gradually withdraws the die plate 25 from the mould box 21 and with it the formed brick 47 as shown in Figure 3. The brick is then carried round until it comes into contact with a fixed projecting finger 54 which sweeps the brick from the die plate 25 on plunger 23 onto the inclined counter weighted platform 48 from which it slides to the conveyor 49. The top end of the platform 48 is depressed by the plunger 23 before the brick is deposited thereon, but immediately the plunger loses contact with the platform the counter weight 61 on the lower end causes it to quickly assume its normal inclined position at the same time giving an impulse to the brick causing it to slide quickly onto the conveyor 49.

The small roller 27 is now in engagement with the camway 29 which retains the outer plunger 23 in the projected position until the mould box is again filled, which completes a cycle of operation for one mould box.

Each mould box in turn undergoes the same cycle of operation.

I claim:—

1. An improved rotary brick making machine comprising a rotatably mounted drum and means for rotating same, a radially disposed mould box in periphery of said drum, a pair of radially guided opposing plungers in said mould box, one of said plungers adapted to be operated by a roller moving on curved camways, an adjustable arm having a roller interior of the drum engaging the inner plunger for adjusting the capacity of said mould box, an eccentrically positioned free rotating roller within said drum, and an adjustable free rotating and opposing roller positioned outside the said drums, cooperating with the first-mentioned roller for exerting pressure on said opposing plungers.

2. In an improved rotary brick making machine as set out in claim 1, in which the outer opposing plunger has right angular guide plates moving in guide ways and projecting rollers moving in cam ways.

3. In an improved rotary brick making machine as set out in claim 1, means for operating and controlling the movement of the outer plungers consisting of a fixed camway on which the rollers are adapted to travel during the revolution of the drum substantially as and for the purpose herein set out.

4. In an improved rotary brick making machine as set out in claim 1 means for automatically filling the mould boxes consisting of a feed hopper with attached bottomless receptacle which is adapted to make contact with the periphery of the rotating drum.

5. An improved rotary brick making machine comprising a rotatably mounted drum and means for rotating the same, radially disposed mould boxes in the periphery of the said drum and radially guided inner and outer plungers in said mould boxes, means for operating said plungers, a counter balance inclined tipping platform adapted to be engaged in turn by the outer plungers as the drum revolves, and means for automatically releasing the bricks from the mould boxes to the tipping platform.

6. In an improved rotary brick making machine as set out in claim 1, means for controlling the movement of the inner plungers consisting of projecting rollers which are adapted to engage a curved camway during part of the drums revolution.

7. An improved rotary brick making machine comprising a rotatably mounted drum and means for rotating the same, radially disposed mould boxes in the periphery of the said drum and radially guided inner and outer plungers in said mould boxes, means for operating said plungers, and means for heating the mould boxes and plungers positioned contiguous to and surrounding a portion of the drum periphery.

In testimony whereof he has affixed his signature in presence of two witnesses.

THOMAS OTWAY PARTRIDGE.

Witnesses:
  H. C. CAMPBELL,
  F. O. ALLEN, Jr.